April 18, 1967     T. J. SCARNATO ET AL     3,314,222
ADJUSTABLE MOWER SICKLE GUIDING AND CLAMPING DEVICE
Filed Sept. 3, 1965     2 Sheets-Sheet 2

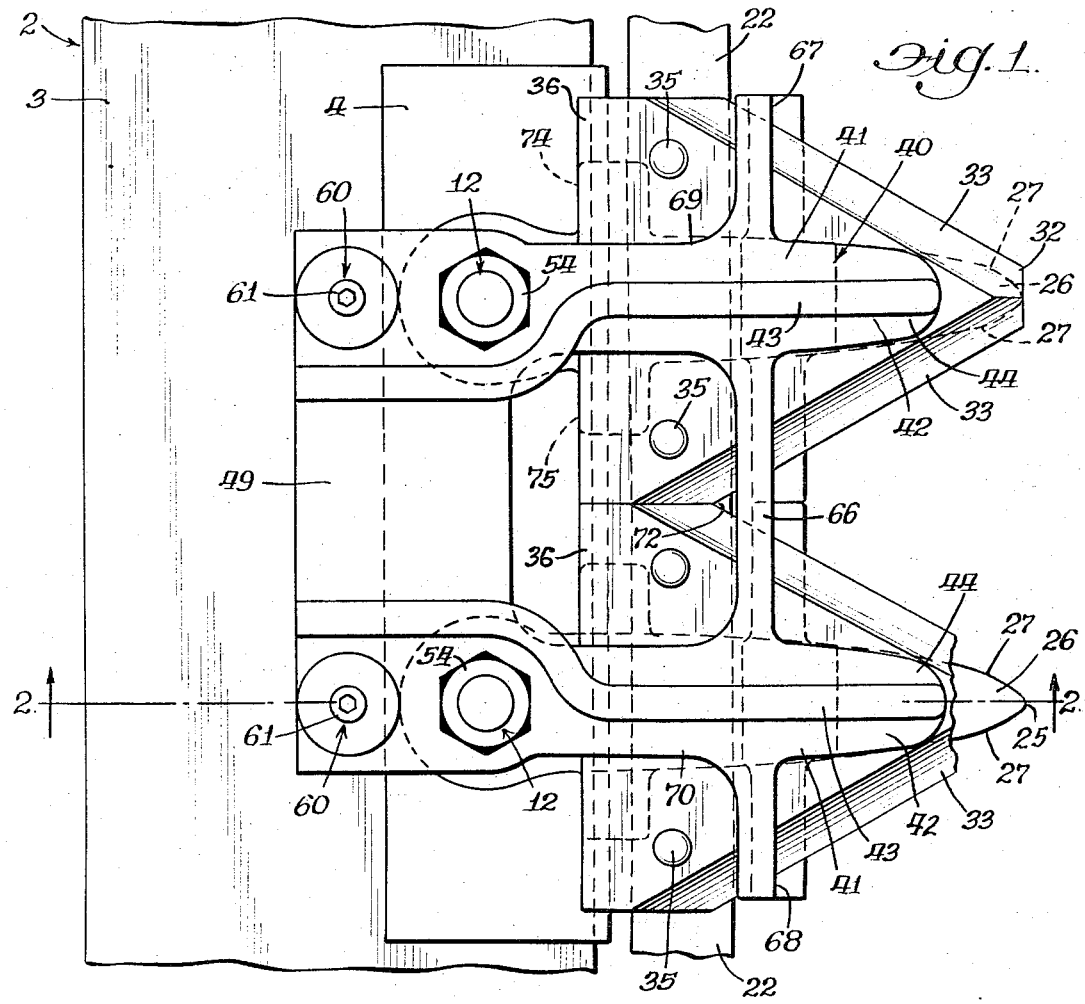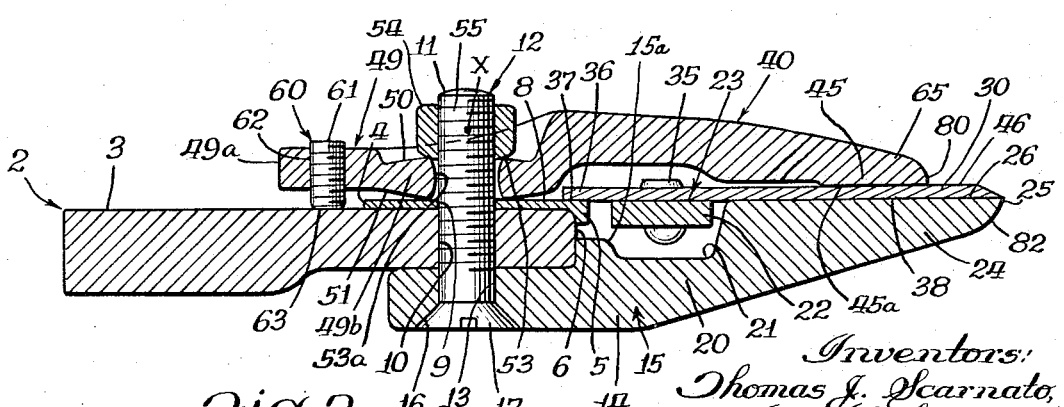

Inventors:
Thomas J. Scarnato
Paul E. Gordon
Robert H. Brunker

John J. Kowalik
Atty.

United States Patent Office 3,314,222
Patented Apr. 18, 1967

3,314,222
ADJUSTABLE MOWER SICKLE GUIDING AND
CLAMPING DEVICE
Thomas J. Scarnato, Park Ridge, Paul C. Gordon, Hinsdale, and Robert H. Brunker, Oaklawn, Ill., assignors to International Harvester Company, Chicago, Ill., a corporation of Delaware
Filed Sept. 3, 1965, Ser. No. 484,929
2 Claims. (Cl. 56—305)

This invention relates to reciprocating mowers and more specifically to a novel device for maintaining the sickle in shearing relationship with the mower guards or for maintaining the relatively reciprocating cutter portions of the sickle in shearing relationship.

Many attempts have been made to provide a simple and effective arrangement for taking up wear between the clamp and the sickle in a reciprocating mower in order to hold the sickle in shearing relation with guards. In recent years the lengths of reciprocating sickles have increased and the problem of maintaining the sickle sections in shearing relationship, particularly in view of the accelerated speeds at which the parts are operated has been greatly amplified.

Conventional hold-down clips are usually adjusted by the user by hammering down on the clip to bend it toward the sickle. This method of adjustment, of course, is inaccurate, and frequently results in over bending so that the parts bind together and must wear in thus accelerating the wear. The removal or addition of shims is time consuming and in itself is impractical since it requires that the operator have shims and the necessary equipment in the field in order to effect the adjustment.

It has been found that in order to effect a proper adjustment, the clamp must be secured tightly to the support bar of the mower and the increments of adjustment must be made with the parts so secured. If the clamp is loosened, then there is no reference gauge to determine the increments of adjustment.

It is a general object of the invention to provide a novel and efficient construction wherein an effective adjustment between the clamp means and the knife sections is readily made.

A further object of the invention is to provide a novel adjustable clamp or guard construction which is adjustable with the parts in tight assembled condition.

A still further object of the invention is to provide a novel clamp construction which incorporates the fulcrum area clamped against the support or mower bar and where means are provided for tilting the clamp about the fulcrum area while the parts are in tight secured engagement with each other.

More specifically, the invention comprehends the provision of clamping means for the sickle, said means incorporating a portion overhanging the sickle and a mounting portion with external convex areas through which there extends a securing bolt by means of which the clamping means is adapted to be secured through an associated flat surface support, the mounting portion extending rearwardly with respect to the bolt hole and at its rearwardmost portion from the bolt being provided with adjusting means in the form of Allen screws threaded through the last mentioned portion, the screws acting against the flat surface of the mounting or the support bar means whereby by threading of the screws the entire clamping means is fulcrumed about the convex surface in order to advance the clamping portion toward the sickle and this being effected while the bolt and nut assembly tightly hold the clamping means and secure it against the support bar.

These and other objects and advantages inherent in and encompassed by the invention will become more readily apparent from the specification and the drawings wherein:

FIGURE 1 is a fragmentary top plan view of a reciprocating mower incorporating the invention.

FIGURE 2 is a cross-sectional view taken substantially on line 2—2 of FIGURE 1.

Figure 3:
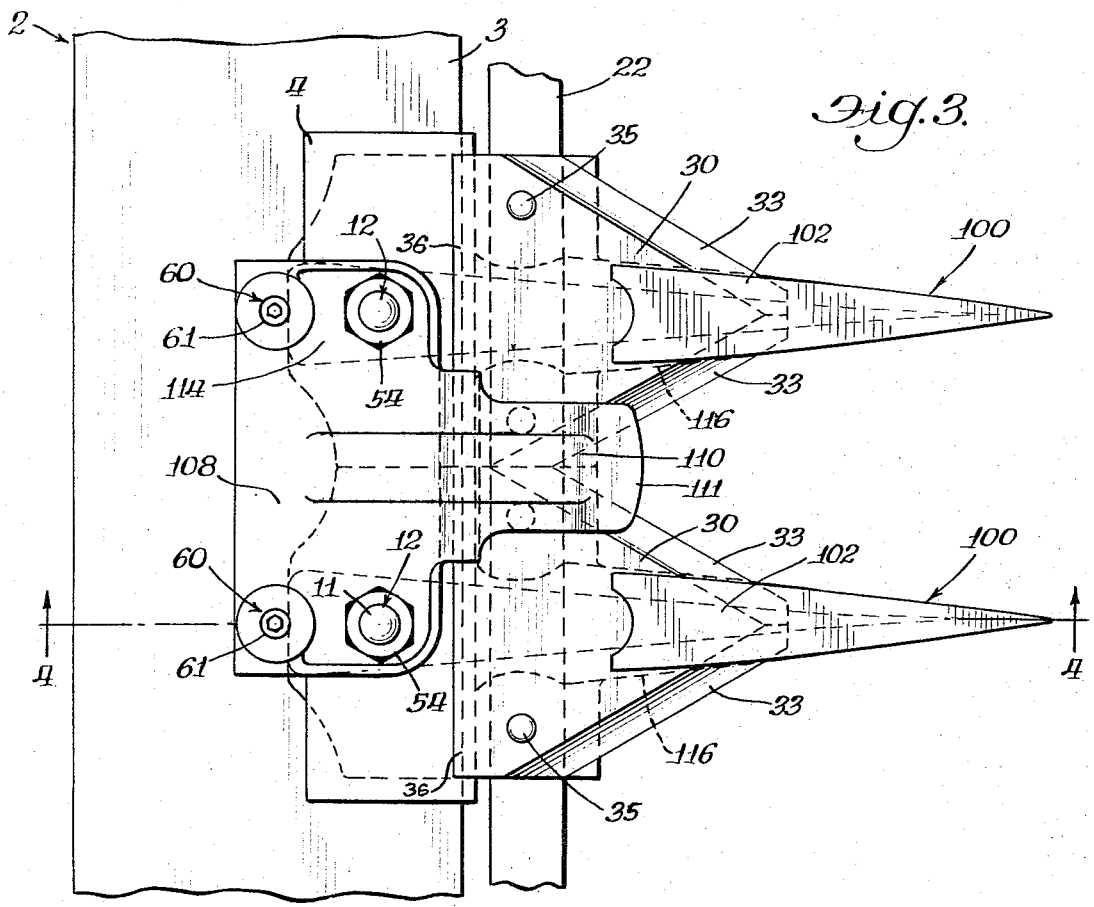
FIGURE 3 is a plan view of another form of the invention, the view being similar to FIGURE 1, and FIGURE 4 being a cross sectional view taken substantially on the line 4—4 of FIGURE 3.

FIGURES 1 and 2 illustrating one form of the invention, show a mower bar 2 which has a substantially flat upper surface 3 on which is mounted a flat wear plate 4 which has a downwardly extending front flange 5 engaging the forward edge 6 of the support bar 2. The wear plate 4 for all intents and purposes may be considered part of the support structure 2. It provides the substantially flat top surface 8 and has a bolt hole 9 therethrough which aligns with a bolt hole 10 in the bar 2 for admitting a shank portion 11 of a bolt generally designated 12. Bolt 12 also extends through an opening 13 in the rear end anchor portion 14 of a lower mower guard generally designated 15.

Guard 15 has a countersunk portion 16 at the lower end of the opening 13 and admits a complementary shaped head 17 of the bolt 12. The portion 14 has an upwardly extending shoulder 15a which abuts against the forward edge 6 of the member 2.

The mower guard 15 has an intermediate portion 20 with a transverse well or slot 21 in its upper side for admitting the backbone or the mounting bar 22 of a sickle generally designated 23. The forward end portion 24 of the guard 15 tapers upwardly and forwardly and terminates in a forward point 25. Guard 15 has an upper flat side 26 and at the lateral extermities of its upper side 26 provides cutting edges 27, 27. The guards 15 support and cooperate with the triangularly shaped sickle sections 30 of the sickle 23, each section 30 terminating in a point 32 and having lateral downwardly beveled cutting edges 33, 33. And the base portion 36 of each section 30 is fastened as by rivets 35, 35 to the top side of the mounting bar 22 which is received within the wells or the slots 21 of the guards 15. It will be appreciated that the bottom of the rear edge portion 36 of each sickle section 30 slidably engages as at 37 the forward edge portion of the wear plate 4 and that the bottom flat side 38 of each sickle section rides on the surface 26 of the associated guard 15. It will be realized that the sickle is constituted of the plurality of these sickle sections all connected to operate conjunctively by means of the connecting bar 22 and that the sickle sections are held in shearing cooperation with the respective guards by means of the clamping means generally designated 40.

In the present instance the clamping means 40 comprises a pair of upper guard sections 41, 41 each of which has an elongated forward finger portion 42 with a central upwardly extending rib 43 and a body 44, the body having a substantially flat forward node portion 45 with a flat under edge 45a opposing and lightly engaging the flat upper surface 46 of the associated sickle section 30. The finger portions 42 extend fore and aft and at their rear ends join with a mounting portion generally designated 49. The mounting portion comprises laterally spaced attachment means 49b in longitudinal alignment with respective finger portions 42, each area having top and bottom convex surfaces 50 and 51. The surface 51 rockably or tangentially engages the surface 8. The surface 50 tangentially engages the bottom surface 53 of a nut 54 which is threaded onto the upper end portion 55 of the shank 11 of the bolt 12. Thus it will be seen that the parts are drawn up tightly together and the guards are prevented from freely rocking about an axis longitudinally of the mower that is transverse of the member 40. After wear occurs on the pads 45 wherein the knife is loose between the surface 38 and the surfaces 45a and while the parts are tightly drawn up together, the clamping means 40 is adjusted by tipping the same about the axis designated X in FIGURE 2 by the adjusting means generally designated 60.

The adjusting means comprises a pair of preferably Allen head screws 61 which are threaded as at 62 to the rear portion 49 of the clamping means adjacent the rear edge 49a thereof. Each screw 61 extends transversely of the support bar 2 and has its lower end engaging as at 63 the top side 3 of the support bar 2. The opening 53a in each attachment area 49b is oversize and accommodates movement of the front end portion 41 of the clamping means or the guard structure downwardly to close up the space between the surface 45a and the surface 38. This is accomplished while the bolt 12 is in tension tightly securing the parts together. Some of the adjusting movement is accommodated by sliding action between the surfaces 8, 51 and 50, 53 and some of it is accommodated through tensioning or shifting of the metal of these parts. Thus, it will be realized that parts are held in tight adjustment and are thus moved only incrementally so to affect the adjustment.

As best seen in FIGURE 1 the medial portions 44 of the upper guards which have forward ends 65, are interconnected immediate their ends by a crossrib 66 which is projected as wings 67, 68 on the remote sides 69 and 70 of the said fingers 41, 41. The rib 66 and the wings 67, 68 serve as sweeps to prevent the hay or grass from accumulating in the apices 72 between adjacent sections 30 and carried laterally to adjacent clamping means 40 and deposited causing hairpinning of this hay or grass in forward node portion 45. It will be realized that in this particular embodiment a rear portion 49 is a single piece interconnecting the fingers 41 to integrate the structure. The lower guards may be provided with portions 74, 75 at opposite sides of its portion 14 and these may extend along the forward edge 6 of the support bar 2.

Figure 4:
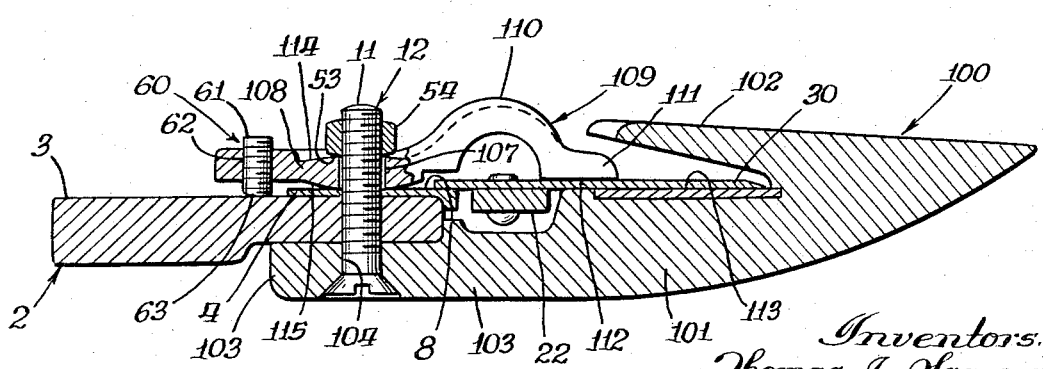

*Description of FIGURES 3 and 4*

FIGURES 3 and 4 represent another embodiment to the invention and parts comparable to the embodiments of FIGURES 1 and 2 are identified by the same reference numerals.

In this embodiment conventional guard fingers 100 are shown, each guard finger having a body portion 101, lip 102, overlapping the respective knife section 30. The rear end 103 of each finger 100 is apertured as at 104 to admit the lower end of the bolt 12 the shank 11 of which passes through the plate 4 and through an aperture 107 in a rear portion 108 of a clamp 109, said clamp having a forward contour similar to the clamps heretofore used, having an upwardly bowed arch portion 110 terminating at its forward end in a generally horizontally extending pad portion 111 which at its lower end has a surface 112 opposing surface 113 on guard 101 to provide a sickle section-accommodating space therebetween. Rear portion 108 is provided with top and bottom arcuate or convex surfaces 114, 115, the surface 114 engaging the surface 53 of the nut 54 and the surface 115 engaging the surface 8 of the wear plate 4. The clamp is rocked in the direction advancing the surface 112 toward the surface 113 by means of the adjusting screw 61 of the adjusting means 62. The adjustment of this clamp is the same as heretofore described in connection with the previous embodiment, namely, that the screw 61 is threaded downwardly against the surface 3 bearing as at 63 and in view of the tightness of the securing bolt the surfaces 114, 115 slip along the complementary surfaces and furthermore within certain limits there is some distortion of the middle contacting areas with the shank area of the bolt also being partly distorted depending upon the dimensions between the parts and also size of the opening 107. However, it will be realized that the clamps do not have to be loosened before the adjustment takes place but merely threading the screws 61 downwardly closes the gap between the surfaces 112, 113 thereby effectively confining the knife sections therebetween in order to effect an adequate shearing action with the respective cutting edges 116 on the knife guards.

An important aspect of the present invention besides the foregoing in the embodiment FIGURES 1 and 2, is that we noticed that the forward ends 80 of each finger portion 41 terminates short of the forward end 32 of the respective sickle section 30 and that the ends 32 terminate substantially in vertical alignment with the forward end 25 of the respective guard 15. Thus an active cutting area is provided to eliminate hairpinning. Although the guard clamping means is shown on the top of the support bar the same may be mounted beneath the bar for other applications including double sickle mowers as is well known to those skilled in the art.

1. In a mower, a support bar having an upper surface, mower guards mounted on the bar in laterally spaced relation along the length thereof and projecting forwardly therefrom, means providing laterally spaced cutting edges on the guards and an intervening upwardly facing guide surface, a sickle having a plurality of substantially triangular knife sections arranged in side by side relationship and having lateral cutting edges disposed in shearing relation with the cutting edges on respective guards, and clamping means opposing said guards and therewith receiving said sickle therebetween and having a forward portion with knife-guide means overlying the sections, and a rear portion including means serving as a fulcrum seated upon said upper surface, a bolt and nut assembly securing said clamping means through said rear portion against said surface to prevent free canting movements of the clamping means toward and away with respect to said sickle, and means for forcibly canting said clamping means in a direction advancing said forward portion toward said sickle with said guide means in close guiding relation to said sections while said bolt and nut assembly is tightly securing the clamping means to the support bar, and said upper surface being substantially flat and said fulcrum means comprising upper and lower convex surfaces on said rear portion and the lower surface tangentially engaging said upper surface on a line extending longitudinally of the mower and said bolt and nut assembly having a head element and a nut element one of which comprises a generally flat surface in tangential engagement with said upper convex surface.

2. For use in a mower having a cutter bar including a sickle and mower guards with cutting means shearingly cooperative with the sickle, guiding and adjusting clamping means for a sickle of a reciprocating mower comprising a body portion having a forward sickle engaging portion and a rear mounting portion, and fulcrum means on said rear portion serving as means to accommodate canting movements of the clamping means about an axis extending transversely thereof and comprising top and bottom convex surfaces on said mounting portion, bolt aperture means through the said convex surfaces, screw means connectible to said mounting portion, said screw means being located in an area of said mounting portion remote from said forward portion and adapted to engage the cutter bar for adjustment of said clamping means to insure proper relationship of the sickle to the guard cutting means.

References Cited by the Examiner
UNITED STATES PATENTS

| | | | |
|---|---|---|---|
| 731,611 | 6/1903 | Pridemore | 56—305 |
| 762,717 | 6/1904 | Hobson | 56—305 |
| 870,358 | 11/1907 | Griffiths | 56—305 |
| 888,491 | 5/1908 | Hampton | 56—305 X |
| 2,024,309 | 12/1939 | Smith | 56—305 |
| 2,156,745 | 5/1939 | Stathem | 56—305 |
| 3,052,078 | 7/1962 | Padgett | 56—305 |
| 3,162,991 | 12/1964 | Maxant | 56—305 |

ABRAHAM G. STONE, *Primary Examiner.*

RUSSELL R. KINSEY, *Examiner.*